United States Patent
Imamura (nee Suzuki)

(10) Patent No.: US 6,178,042 B1
(45) Date of Patent: Jan. 23, 2001

(54) REAL IMAGE MODE FINDER AND CAMERA USING THE SAME

(75) Inventor: Masahiro Imamura (nee Suzuki), Hachioji (JP)

(73) Assignee: Olympus Optical Co., Ltd., Tokyo (JP)

(*) Notice: Under 35 U.S.C. 154(b), the term of this patent shall be extended for 0 days.

(21) Appl. No.: 09/444,394

(22) Filed: Nov. 22, 1999

Related U.S. Application Data

(63) Continuation-in-part of application No. 09/009,766, filed on Jan. 20, 1998, now abandoned.

(30) Foreign Application Priority Data

Jan. 21, 1997 (JP) .................................................... 9-008549

(51) Int. Cl.[7] .............................. G02B 23/00; G02B 5/04
(52) U.S. Cl. ......................... 359/431; 359/834; 359/837; 396/386
(58) Field of Search ........................... 359/362, 420–422, 359/431–433, 676–680, 630–631, 831–837; 396/373–386

(56) References Cited

U.S. PATENT DOCUMENTS

| | | | |
|---|---|---|---|
| 3,819,255 | * 6/1974 | Matui | 396/386 |
| 4,475,059 | 10/1984 | Sink | 359/614 |
| 4,609,272 | 9/1986 | Yokota et al. | 396/384 |
| 4,673,262 | 6/1987 | Tsuji | 396/386 |
| 5,130,855 | 7/1992 | Mukai et al. | 359/836 |
| 5,247,324 | 9/1993 | Estelle | 359/676 |
| 5,323,264 | 6/1994 | Kato | 359/432 |
| 5,640,632 | 6/1997 | Koyama et al. | 359/432 |
| 5,751,494 | * 5/1998 | Takahashi | 359/631 |
| 5,754,336 | 5/1998 | Kanai | 359/431 |
| 5,812,323 | * 9/1998 | Takahashi | 359/630 |
| 5,920,428 | * 7/1999 | Kim | 359/431 |

FOREIGN PATENT DOCUMENTS

| | | | |
|---|---|---|---|
| 61-221730 | 10/1986 | (JP) | 359/422 |
| 8-129203 | 5/1996 | (JP) . | |
| 8-179400 | 7/1996 | (JP) . | |
| 10-206933 | 8/1998 | (JP) . | |

* cited by examiner

Primary Examiner—Thong Nguyen
(74) Attorney, Agent, or Firm—Pillsbury Madison & Sutro LLP

(57) ABSTRACT

A real image mode finder includes an objective optical system and an eyepiece optical system which has at least one reflecting surface. The objective optical system includes, in order from the object side, an objective unit, a first prism and a second prism. The first prism has an entrance surface which transmits a light beam emerging from the objective unit and a transmission surface which is optically inclined with respect to the entrance surface. The second prism has a reflecting surface, situated nearly opposite to the entrance surface of the first prism, for obliquely reflecting the light beam transmitted through the first prism toward the object side, a transmitting-reflecting surface located nearly parallel with the transmission surface of the first prism, at a minute distance away therefrom, to transmit the light transmitted through the first prism and to totally reflect the light from the reflecting surface, and an exit surface. The objective unit, the first prism and the second prism form an intermediate image plane adjacent to the exit surface of the second prism. The real image mode finder, as well as a camera using the same, is made compact and achieves high performance.

27 Claims, 8 Drawing Sheets

FIG. 3A  γ < 90°
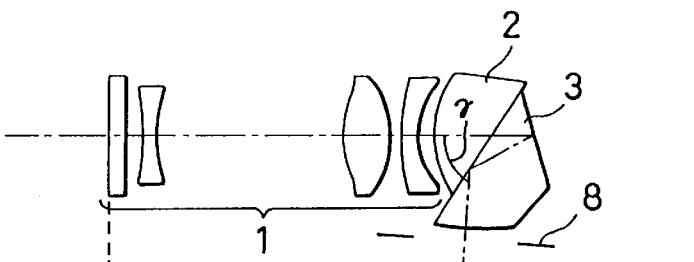
FIG. 3B  γ = 90°
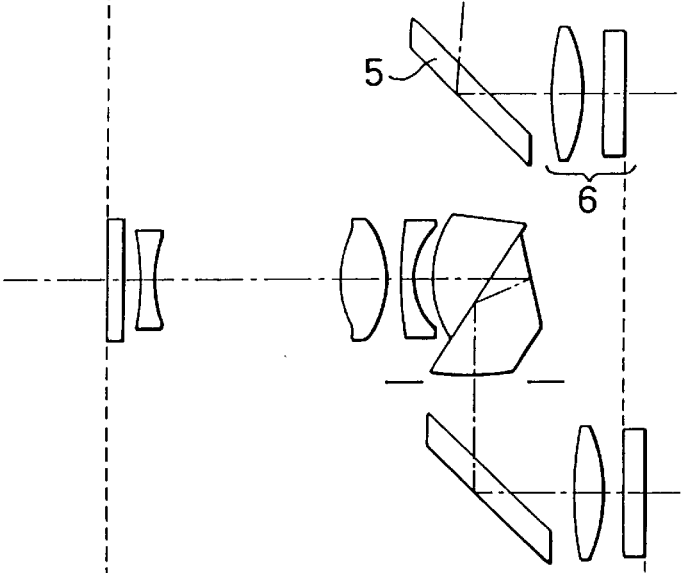
FIG. 3C  γ > 90°
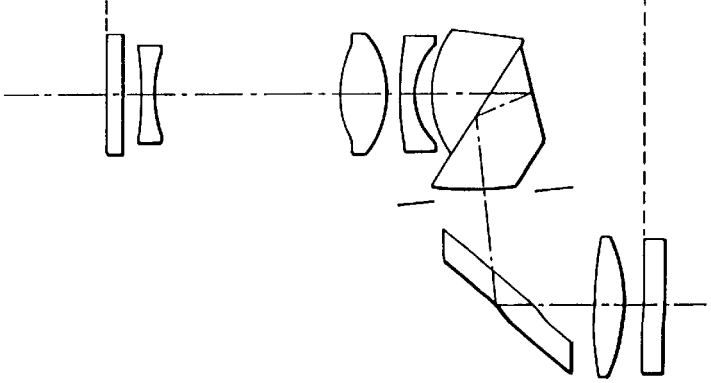

REAL IMAGE MODE FINDER AND CAMERA USING THE SAME

This is a continuation-in-part of application Ser. No. 09/009,766, filed on Jan. 20, 1998, now abandoned.

BACKGROUND OF THE INVENTION

1. Field of the Invention

This invention relates to a real image mode finder in which an object image formed by an objective optical system is observed through an eyepiece optical system, used in a photographic camera, a still video camera or the like, and also relates to a camera using such a real image mode finder.

2. Description of Related Art

In a photographic or video camera, a real image mode finder, in which an object image formed by an objective optical system is observed through an eyepiece optical system, has been widely used. In particular, as an image erecting means provided in this finder, a Porro prism or a roof pentaprism is often adopted.

Recently, the needs for a high variable magnification ratio of the finder and compactness of the camera have been emphasized. In addition to conventional systems, several proposals have been made with respect to the image erecting means of real image mode finders so that finder units should be compact and achieve high magnification.

One of these, for example, Japanese Patent Preliminary Publication No. Hei 8-129203, discloses a real image mode finder. This finder is designed so that a light beam emerging from an objective lens, after being obliquely bent by planar reflecting members toward the pupil side and then toward the object side, is further bent by a roof reflecting surface toward the pupil side and is introduced into an eyepiece. The arrangement of this finder is made so that the planar reflecting member, which obliquely reflects the light beam toward the object side, has a normal line inclined toward the optical axis of the objective lens, thereby enabling the entire length of the finder to be reduced.

On the other hand, Japanese patent Preliminary Publication No. Hei 8-179400 proposes the image erecting means of a real image mode finder. The image erecting means disclosed in this publication is such that, by combining a roof prism and triangular prisms, which are arranged in that order from the object side, a total reflection-transmission property of the surface of one of the triangular prisms is utilized for twice-reflecting a light beam in these prisms. With this image erecting means, an optical path length from an intermediate imaging plane to an eyepiece can be reduced, and thus it becomes possible that the focal length of the eyepiece is reduced to increase the finder magnification.

However, the finder disclosed in Hei 8-129203 mentioned above has the drawback that since it is constructed so that the light beam is reflected once at an angle toward the pupil side by the reflecting surface placed after the objective lens, looking from the object side, the objective lens projects toward the object side and as a result, the finder enlarges along the optical axis. Furthermore, because the light beam passing through the objective lens must be reflected at a certain angle toward the object side, the finder tends to be naturally enlarged in a direction perpendicular to the optical axis of the objective lens. Hence, in the finder, if an attempt is made to prevent the objective lens from projecting and to enlarge an effective beam diameter, the optical path length on the eyepiece side must be increased. This situation is unsuitable for the finder placed in a limited space.

The finder set forth in Hei 8-179400, by contrast, diminishes the size of the eyepiece system. Since, however, a roof surface is used for the reflecting surface placed after the objective lens, viewed from the object side, the angle of inclination made by the roof surface with the optical axis of the objective lens, in contrast with that of a roof-pentaprism type, is liable to increase because of the property of the prism placed after the roof surface. Specifically, arrangements are made so that, in the case of the roof-pentaprism type, its roof surface facilitates the reflection of the light beam toward the object side, while in the finder set forth in Hei 8-179400, its roof surface facilitates the reflection of the light beam toward the pupil side. Hence, the arrangement such that the light beam is reflected toward the object side is lacking in compactness, and this is unfavorable. That is, this finder, compared with the roof-pentaprism type, has the disadvantage that the objective lens is liable to project toward the object side.

SUMMARY OF THE INVENTION

It is, therefore, an object of the present invention to provide a real image mode finder in which, by a proper arrangement of prisms or roof surfaces in the optical path, an inverted real image formed by an objective optical system is converted into an erect image so that good observation can be made and which is compact in design and high in performance, as well as to provide a camera using such a real image mode finder.

In order to achieve this object, the real image mode finder according to the present invention comprises, in order from the object side, an objective optical system and an eyepiece optical system having at least one reflecting surface. The objective optical system includes an objective unit, a first prism and a second prism. The first prism has an entrance surface which transmits a light beam emerging from the objective unit and a transmission surface which is arranged to be optically inclined with respect to the entrance surface so that a ray that travels along an optical axis of the objective unit is obliquely incident on the transmission surface. The second prism has a reflecting surface, which is situated nearly opposite to the entrance surface of the first prism and which obliquely reflects the light beam transmitted through the first prism toward the object side, a transmitting-reflecting surface which is located nearly parallel with the transmission surface of the first prism, at a minute distance away therefrom, to transmit the light transmitted through the first prism and to totally reflect the light from the reflecting surface, and an exit surface. The objective unit, the first prism and the second prism form an intermediate image plane adjacent to the exit surface of the second prism.

Further, according to the present invention, the light beam emerging from the objective unit and transmitted through the entrance surface of the first prism is directly introduced (i.e. without reflection) to the transmission surface of the first prism.

Further, in the real image mode finder of the present invention, the reflecting surface of the second prism may be constructed with a planar surface with the reflecting surface of the eyepiece optical system being configured as a roof surface.

Alternatively, the reflecting surface of the second prism may be constructed with a roof surface with the reflecting surface of the eyepiece optical system being configured as a planar surface.

This and other objects as well as features and advantages of the present invention will become apparent from the following detailed description of the preferred embodiments when taken in conjunction with the accompanying drawings.

BRIEF DESCRIPTION OF THE DRAWINGS

FIGS. 3A, 3B and 3C are views for explaining the relationship between an angle made by the optical axis of an objective unit with an axis equivalent to the optical axis of the objective unit as leaving the second prism after passing through the first prism and being bent by the second prism, and the entire length of the finder of the present invention;

DETAILED DESCRIPTION OF THE PREFERRED EMBODIMENTS

Figure 1:
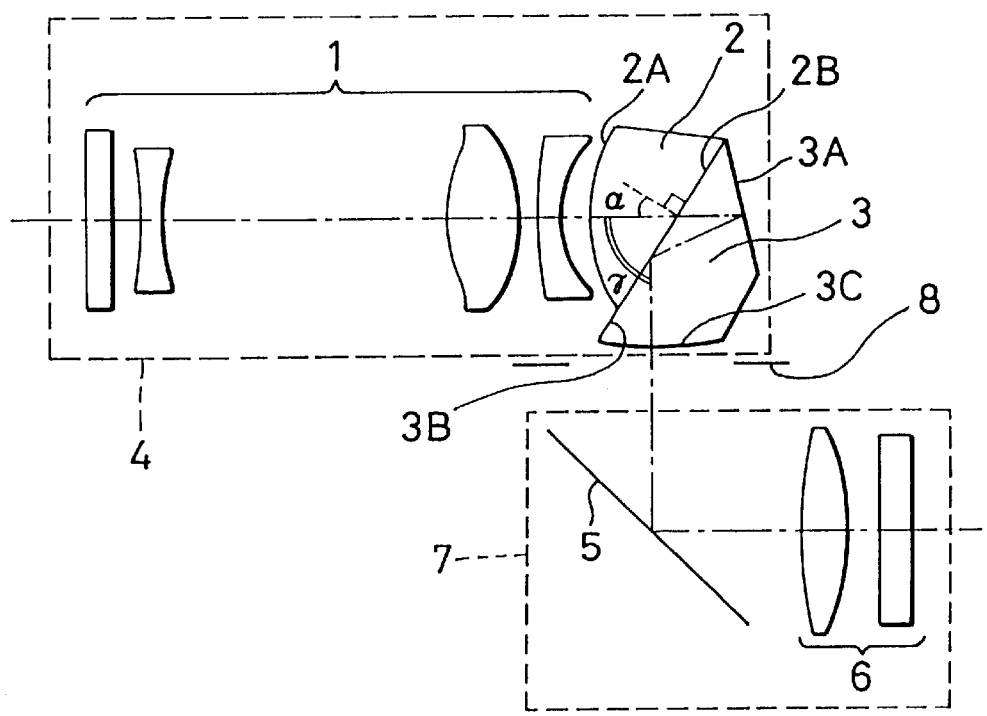
FIG. 1 is a sectional view schematically showing the arrangement, developed along an optical axis, of the real image mode finder of the present invention.

A fundamental arrangement of the real image mode finder according to the present invention is explained with reference to FIG. 1. As shown in the figure, the real image mode finder of the present invention includes, in order from the object side, an objective optical system 4 composed of an objective unit 1, a first prism 2, and a second prism 3, and an eyepiece optical system 7 composed of a reflecting member (reflecting surface) 5 and an eyepiece unit 6. Reference numeral 8 represents an intermediate image plane.

In the real image mode finder of the present invention, a light beam from an object is incident through the objective unit 1 on an entrance surface 2A of the first prism 2 and then is transmitted through the transmission surface 2B thereof. This light beam is incident on a transmitting-reflecting surface 3B of the second prism 3. The surface 3B is located, nearly parallel with the transmission surface 2B, at a minute distance away therefrom. The light beam incident on the second prism 3 is reflected at an angle toward the object side by a reflecting surface 3A located nearly opposite to the entrance surface 2A of the first prism 2, and reaches again the surface 3B of the second prism 3. The light beam, after being totally reflected there, emerges from an exit surface 3C of the second prism 3. Subsequently, the light beam forms an object image at the intermediate image plane 8 situated at some distance away from the exit surface 3C. The image is then reflected by the reflecting member 5 and is introduced through the eyepiece unit 6 into an observer's pupil as an erect image.

Here, a normal to the transmission surface 2B of the first prism 2 is inclined by an angle α with respect to the optical axis of the objective unit 1 in a plane in which a ray that travels along the optical axis of the objective unit 1 and that is bent by the reflecting surface 3A of the second prism 3 lies. An axis equivalent to the optical axis of the object unit 1 (i.e. the path of the ray that travels along the optical axis of the objective unit 1), as it leaves the exit surface 3C of the second prism 3 after being bent through the first prism 2 by the second prism 3, makes an angle γ with the optical axis of the objective unit 1.

The ray of light travelling along the optical axis of the objective unit 1 and transmitted through the entrance surface 2A of the first prism 2 can be transmitted through the transmission surface 2B without total reflection if the following condition (1) is satisfied:

$$\alpha < \sin^{-1}(NA/n_1) \quad (1)$$

where NA is the refractive index of air and $n_1$ is the refractive index of the material of the first prism 2.

Figure 2:
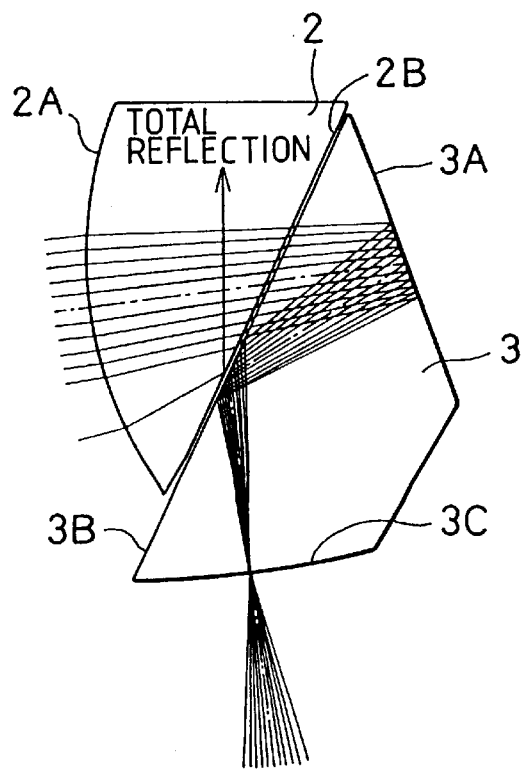
FIG. 2 is a sectional, enlarged view showing a first prism and a second prism in FIG. 1.

However, rays included in an effective light beam may be incident on the entrance surface 2A of the first prism 2 at angles in a certain range because the effective light beam has a spread angle as illustrated in FIG. 2. In this way, even if Condition (1) is satisfied, a part of the effective light beam undergoes total reflection at the reflecting surface 2B of the first prism 2.

When the focal length of the eyepiece optical system 7 is designated by $f_e$ (unit: mm), the refractive index of the material of the second prism 3 by $n_2$, and the pupil diameter (4 mm) by $\phi$, a spread angle δ of the light beam incident on the objective optical system 4 from an object that lies on the extension line of the optical axis of the objective unit 1 is approximately expressed by $$\delta = \tan^{-1}\{2NA/(n_2 f_e)\} \quad (2)$$

Hence, from Conditions (1) and (2), it is found that, in order to entirely transmit any effective light beam through the transmission surface 2B of the second prism 2, it is necessary to satisfy the following condition:

$$\alpha \leq \sin^{-1}(NA/n_1) - \tan^{-1}\{2NA/(n_2 f_e)\} \quad (3)$$

Here, the angle γ made by the axis equivalent to the optical axis of the object unit 1, as it leaves the exit surface 3C of the second prism 3 after being bent through the first prism 2 by the second prism 3, with the optical axis of the objective unit 1 is a parameter relative to the length of the finder in a direction along the optical axis of the objective unit 1. If the value of the angle γ is smaller than 90° as shown in FIG. 3A, the eyepiece unit 6 will be shifted to the object side (the left of the figure) and thus the length of the finder in the direction along the optical axis of the objective unit 1 becomes short, but it is necessary to increase the back focal distance of the objective unit 1. On the other hand, if the value of the angle γ is larger than 90° as shown in FIG. 3C, an optical path length required for the back focal distance of the objective unit 1 can be reduced, but the length of the finder in the direction along the optical axis of the objective unit 1 increases.

In order to design a compact finder in view of these points, it is desirable that the value of the angle γ is set to 90° as shown in FIG. 3B. It is required, at least, that the value of the angle γ satisfies the following condition:

$$80° \leq \gamma \leq 100° \quad (4)$$

The real image mode finder of the present invention is designed so that rays of light are transmitted through the first prism and totally reflected by the second prism. Where light has been transmitted through one medium to be incident on another medium, the critical angle, as well be evident from Condition (1), decreases with increasing refractive index of the medium that has transmitted the light. For this reason, as the refractive index $n_1$ of the material of the first prism 2 is increased, the angle of inclination α is required to be smaller. Hence, where an attempt is made to set the angle γ to a value close to 90°, it is necessary to considerably increase the back focal distance of the objective unit. In this case, there is the advantage that if the refractive index $n_2$ of the material of the second prism 3 is higher, the optical path length can be increased. If the refractive index $n_1$ of the material of the first prism 2 is low, the angle of inclination α can be set to a relatively large value. In this case, however, it is favorable that the refractive index $n_1$ of the material of the first prism 2 be made higher than the refractive index $n_2$ of the material of the second prism 3 in order to bring about total reflection at the surface 3B of the second prism 3. However, if the refractive index $n_1$ of the material of the first prism 2 is largely different from the refractive index $n_2$ of the material of the second prism 3, the optical path length will vary widely with paths along which the rays pass through the prisms. It should be noted that this causes problems with the performance of the finder.

In view of this, it is desirable to satisfy the following condition:

$$0 \leq n_2 - n_1 < 0.1 \tag{5}$$

As mentioned above, the real image mode finder of the present invention is designed so that the first prism 2 transmits the incident beam. However, since the transmission surface 2B of the first prism 2 is obliquely disposed with respect to the optical axis of the objective unit 1, it reflects the incident beam toward the object side also. Thus, this reflected light can be responsible for ghost or flare. In the real image mode finder of the present invention, the transmission surface 2B of the first prism 2 and the transmitting-reflecting surface 3B of the second prism 3 are spaced a minute distance apart and arranged nearly parallel with each other. Consequently, ghost is liable to occur between the transmission surface 2B and the transmitting-reflecting surface 3B also.

Thus, in order to prevent such ghost or flare, it is necessary to apply an anti-reflection coating to either the transmission surface 2B of the first prism 2 or the transmitting-reflecting surface 3B of the second prism 3. The application of the anti-reflection coating to the transmission surface 2B of the first prism 2 is particularly effective.

In the real image mode finder of the present invention, there is the fear that any ray other than the effective beam should undergo total reflection at the transmission surface 2B of the first prism 2 and becomes detrimental light. In order to avoid this problem, it is favorable that at least one part, other than the effective portions of the prisms, should receive surface treatment for obviating the detrimental light. For example, a light diffusing surface, a surface coated with a light absorptive substance, a coating, or projections or grooves for eliminating the detrimental light is preferably formed on such a non-effective portion.

It is desirable that the first and second prisms 2 and 3 of the real image mode finder of the present invention, because of their intricate shapes, are made of plastic materials in view of ease of molding and cost.

In the real image mode finder of the present invention, the transmission surface 2B of the first prism 2 and the transmitting-reflecting surface 3B of the second prism 3 are obliquely arranged with respect to the optical axis of the objective unit 1 and have an air space therebetween, to utilize total reflection. If the air space is large, the optical path length will vary widely with incident angles of the rays on the prisms or with paths along which the rays pass through the prisms. This greatly influences aberrations, notably astigmatism, at the pupil position.

Thus, in consideration of the above-mentioned problems as well as influences of temperature and humidity differences on materials of the prisms, and manufacturing errors, it is favorable that an air space d is determined to satisfy the following condition:

$$0 < d \leq 0.2 \text{ mm} \tag{6}$$

The embodiments of the present invention will be explained in detail below.

First Embodiment

Figure 4:
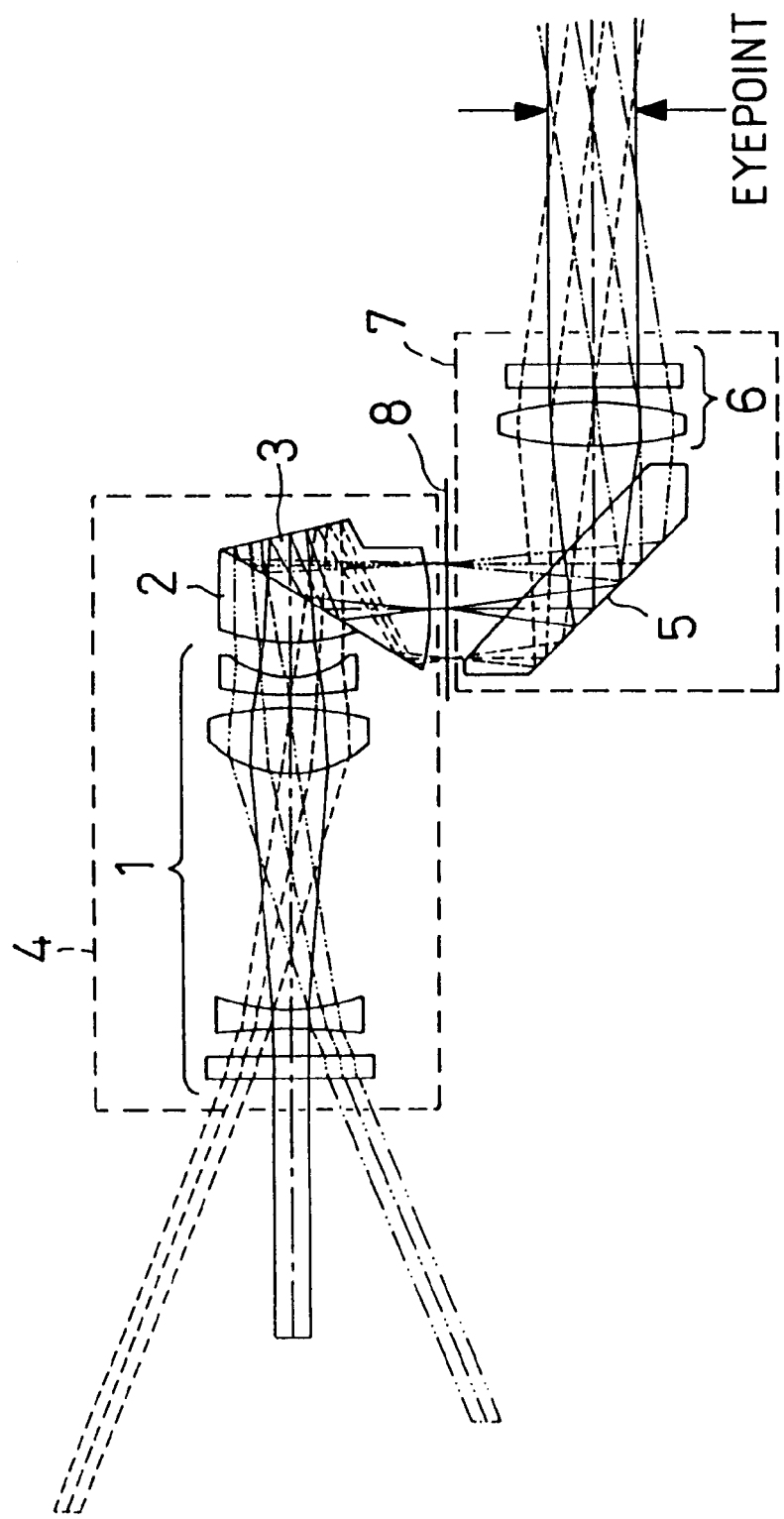
FIG. 4 is a sectional view schematically showing the arrangement, developed along the optical axis, of the real image mode finder of a first embodiment in the present invention.

As shown in FIG. 4, the real image mode finder of this embodiment includes, in order from the object side, the objective optical system 4 composed of the objective unit 1, the first prism 2, and the second prism 3; and the eyepiece optical system 7 composed of the reflecting member 5 and the eyepiece unit 6. Reference numeral 8 represents the intermediate image plane.

In the real image mode finder of the first embodiment, the reflecting surface 3A is constructed with a planar surface, and the reflecting member 5, which is included in the eyepiece optical system 7, is configured as a roof surface. For this reason, a prism section can be made compact. Furthermore, since the eyepiece optical system 7 is such that its optical path length can be made short compared with the roof-pentaprism type, the focal length of the eyepiece optical system 7 is reduced and the high magnification of the finder can easily be accomplished. In the real image mode finder of the first embodiment, however, the roof surface is contained in the eyepiece optical system 7 and thus somewhat projects toward the eyepiece unit 6.

In order to make the finder compact along the optical axis of the objective unit 1, it is desirable that the angle α is set to be slightly smaller than 90°.

In the real image mode finder of the first embodiment, respective lens members constituting the objective unit 1 are moved along the optical axis, and thereby the magnification of the finder can be changed. It is also possible to provide the entrance surface 2A of the first prism 2 with a curvature for correction for aberration. In addition, by providing the exit surface 3C of the second prism 3 with a curvature, the second prism 3 is capable of functioning as a condenser lens.

In the real image mode finder of the first embodiment, it is possible that the reflecting member 5 in the eyepiece optical system 7 is constructed with a roof prism made of plastic or glass.

Table 1 gives constant values defined by the real image mode finder of the first embodiment.

TABLE 1

| | |
|---|---|
| α | 32° |
| γ | 90° |
| $n_1$ | 1.525 |
| $n_2$ | 1.525 |
| NA | 1 |
| $f_e$ | 19 |
| d | 0.1 |

Second Embodiment

Figure 5:
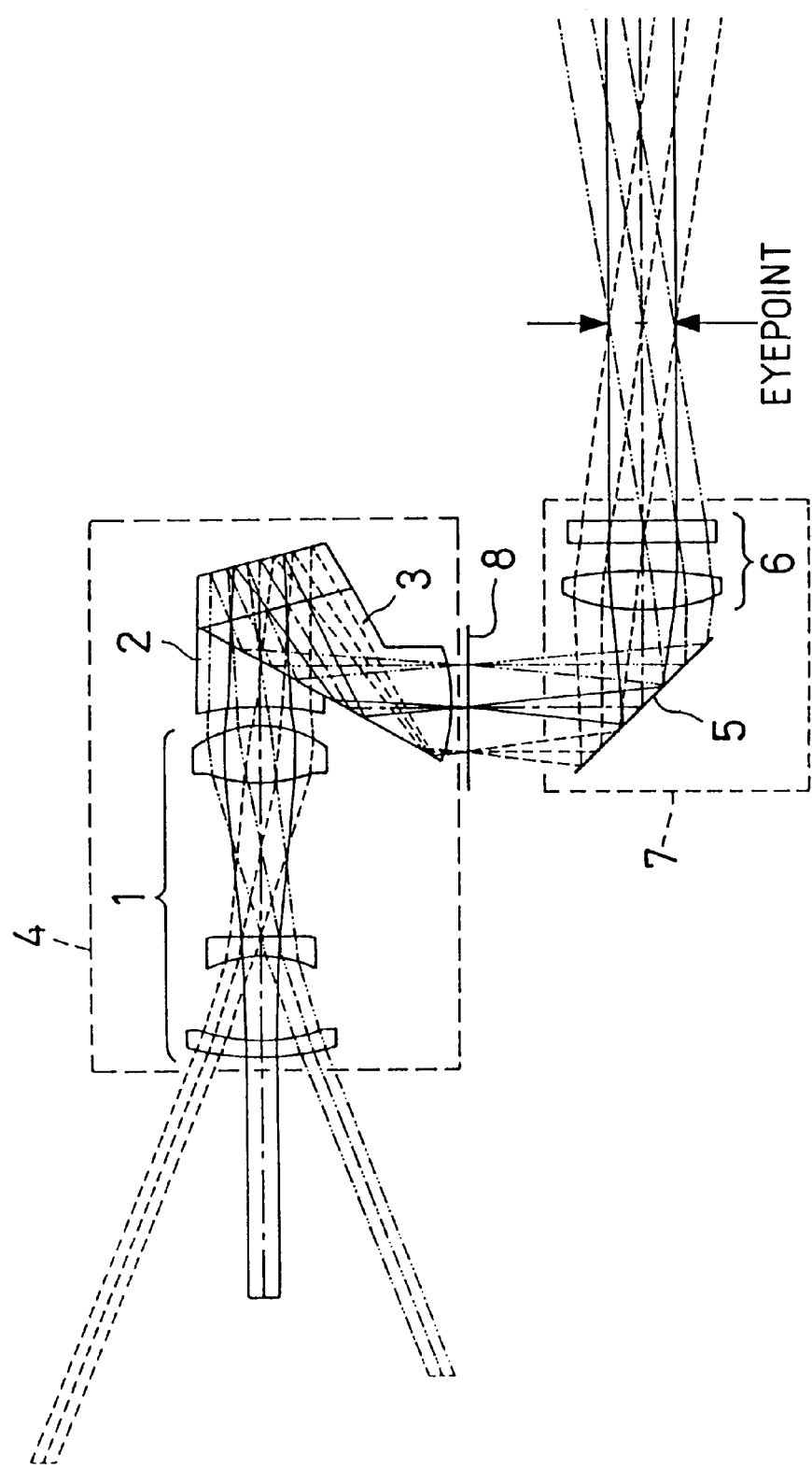
FIG. 5 is a sectional view schematically showing the arrangement, developed along the optical axis, of the real image mode finder of a second embodiment in the present invention.

The real image mode finder of this embodiment, as shown in FIG. 5, has almost the same arrangement as that of the first embodiment with the exception that the reflecting surface 3A of the second prism 3 is configured as a roof surface and the reflecting member 5 of the eyepiece optical system 7 is constructed with a planar surface.

In the real image mode finder of the second embodiment, because the objective optical system 4 thus includes the roof surface, the objective optical system 4 requires a long back focal distance compared with the case of the first embodiment. Consequently, the prism section (the first and second prisms 2 and 3) of the objective optical system 4, in contrast with the case of the first embodiment, becomes large. Since, however, the spread of the beam diameter at each reflecting surface of the objective optical system is generally smaller than that of the beam diameter at the reflecting member of the eyepiece optical system, the roof surface in the finder of the second embodiment can be made smaller than that in the first embodiment.

Furthermore, this roof surface in the second embodiment is placed nearly perpendicular to the optical axis of the objective unit 1, and thus the whole finder is prevented from projecting along the optical axis of the objective unit 1. As a result, it becomes possible that the entire length of the finder is made shorter than that of the finder of the first embodiment.

Also, the real image mode finder of the second embodiment can also use a prism made of plastic or glass, instead of the reflecting member 5.

Moreover, in the real image mode finder of the second embodiment, like the first embodiment, respective lens members constituting the objective unit 1 are moved along the optical axis and thereby the magnification of the finder can be changed. It is also possible that the entrance surface 2A of the first prism 2 is provided with a curvature to correct for aberration. In addition, by providing the exit surface 3C of the second prism 3 with a curvature, the second prism 3 is capable of functioning as a condenser lens.

Table 2 gives constant values defined by the real image mode finder of the second embodiment.

TABLE 2

| | |
|---|---|
| α | 32° |
| γ | 90° |
| $n_1$ | 1.525 |
| $n_2$ | 1.525 |
| NA | 1 |
| $f_e$ | 18 |
| d | 0.1 |

Third Embodiment

Figure 6:
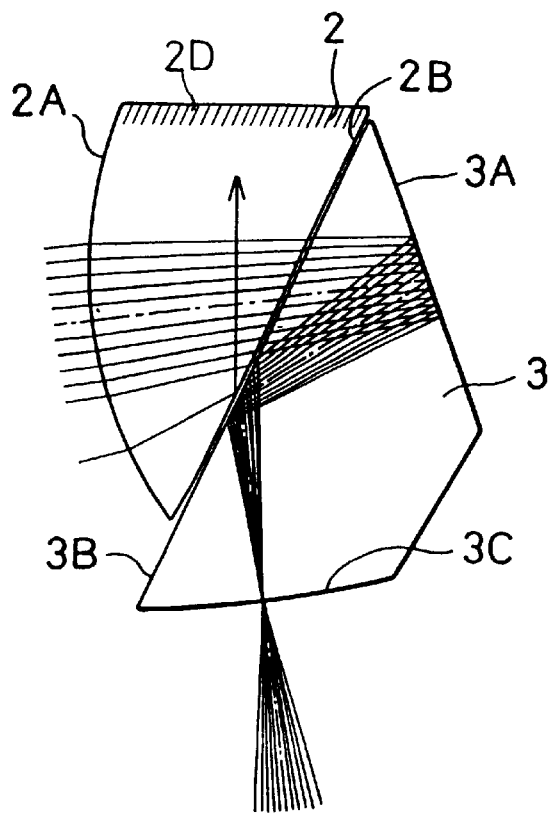
FIG. 6 to FIG. 11 are views showing surface-treated prisms used in the real image mode finders of third to eighth embodiments, respectively, in the present invention.

As shown in FIG. 6, a light absorptive coating (shown by hatching) is applied to a side 2D of the first prism 2, and thereby unwanted detrimental light can be prevented. The application of the light diffusing treatment, instead of the light absorptive coating, brings about the same effect. With the exception of the prisms shown in the figure, the arrangement of the third embodiment is the same as that of the first embodiment.

Fourth Embodiment

Figure 7:
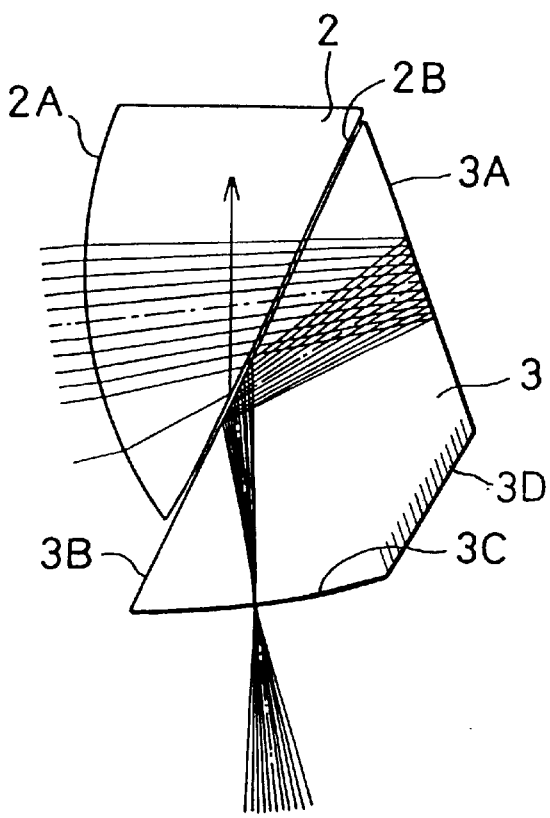

As shown in FIG. 7, a light absorptive coating (shown by hatching) is applied to a side 3D of the second prism 3, and thereby unwanted detrimental light can be prevented. The application of light diffusing treatment, instead of the light absorptive coating, brings about the same effect. With the exception of the prisms shown in the figure, the arrangement of the fourth embodiment is the same as that of the first embodiment.

Fifth Embodiment

Figure 8:
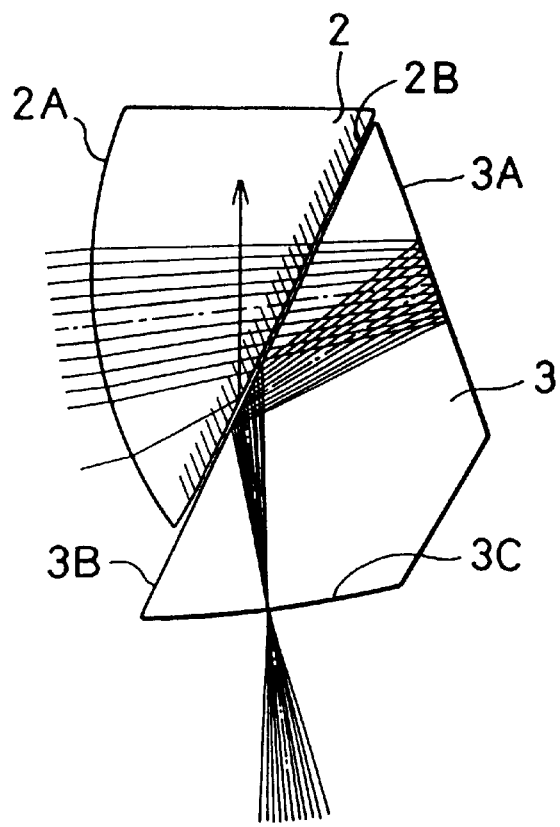

As shown in FIG. 8, a coating (shown by hatching) is applied to the transmission surface 2B of the first prism 2, and thereby ghost can be prevented. This coating may be either a multilayer coating or a single-layer coating, which brings about the same effect. With the exception of the prisms shown in the figure, the arrangement of the fifth embodiment is the same as that of the first embodiment.

Sixth Embodiment

Figure 9:
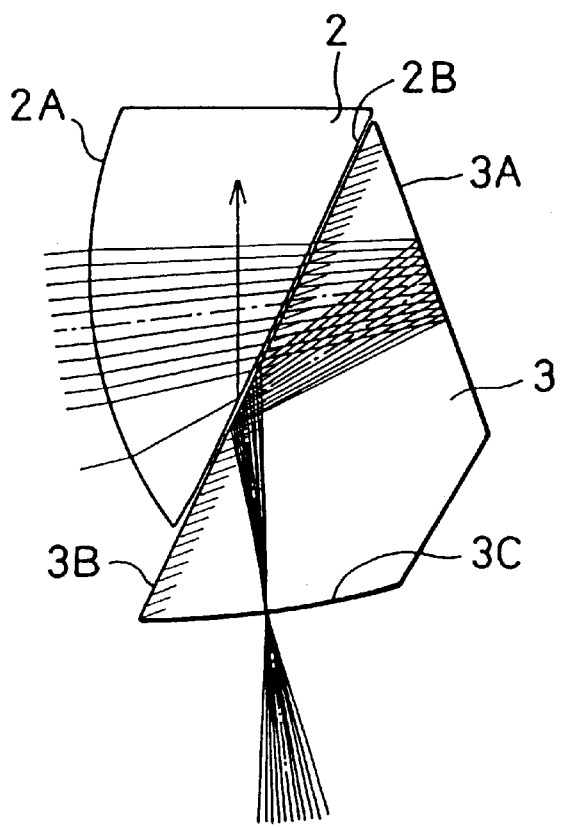

As shown in FIG. 9, a coating (shown by hatching) is applied to the transmitting-reflecting surface 3B of the second prism 3, and thereby ghost can be prevented. This coating may be either a multilayer coating or a single-layer coating, which brings about the same effect. With the exception of the prisms shown in the figure, the arrangement of the sixth embodiment is the same as that of the first embodiment.

Seventh Embodiment

Figure 10:
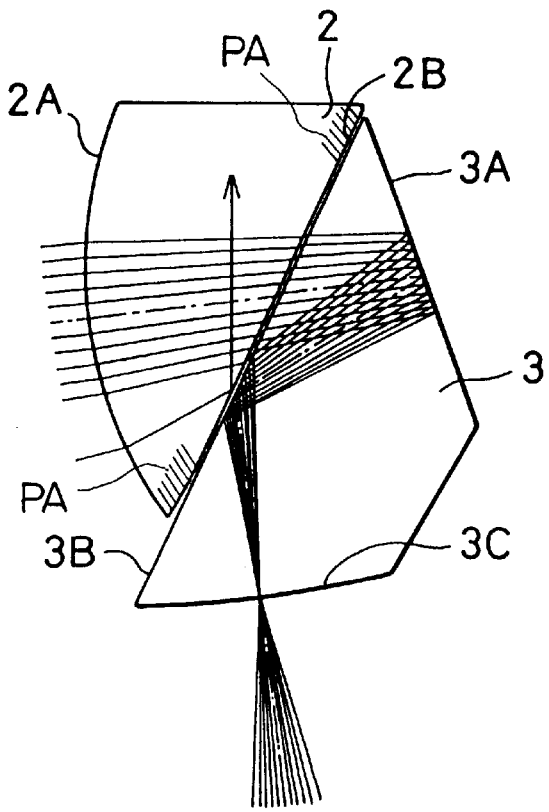

As shown in FIG. 10, the light absorptive coating is applied to parts PA, through which the effective light beam does not pass, on the surfaces of the first prism 2, and thereby unwanted detrimental light can be prevented. With the exception of the prisms shown in the figure, the seventh embodiment has the same arrangement as the first embodiment.

Eighth Embodiment

Figure 11:
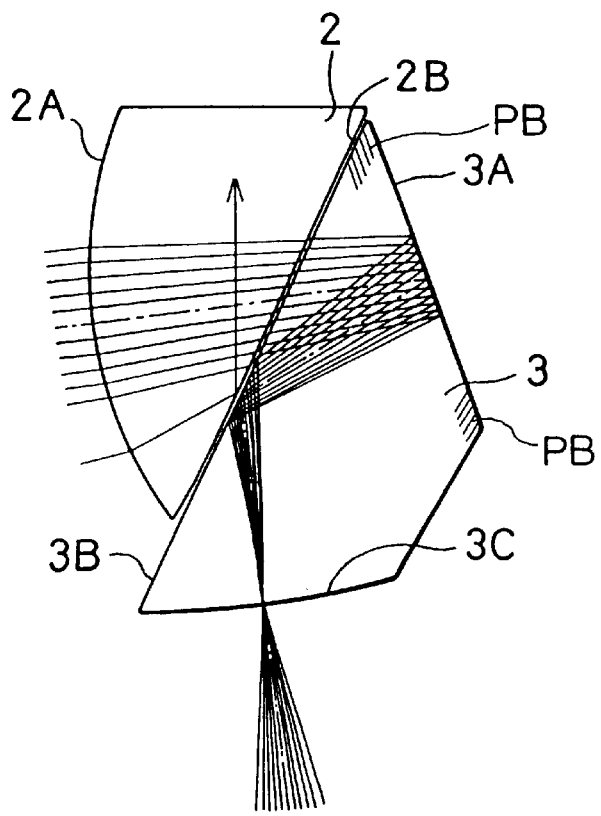

As shown in FIG. 11, light absorptive coatings are applied to parts PB, through which the effective light beam does not pass, on the surfaces of the second prism 3, and thereby unwanted detrimental light can be prevented. With the exception of the prisms shown in the figure, the eighth embodiment has the same arrangement as the first embodiment.

Ninth Embodiment

Figure 12:
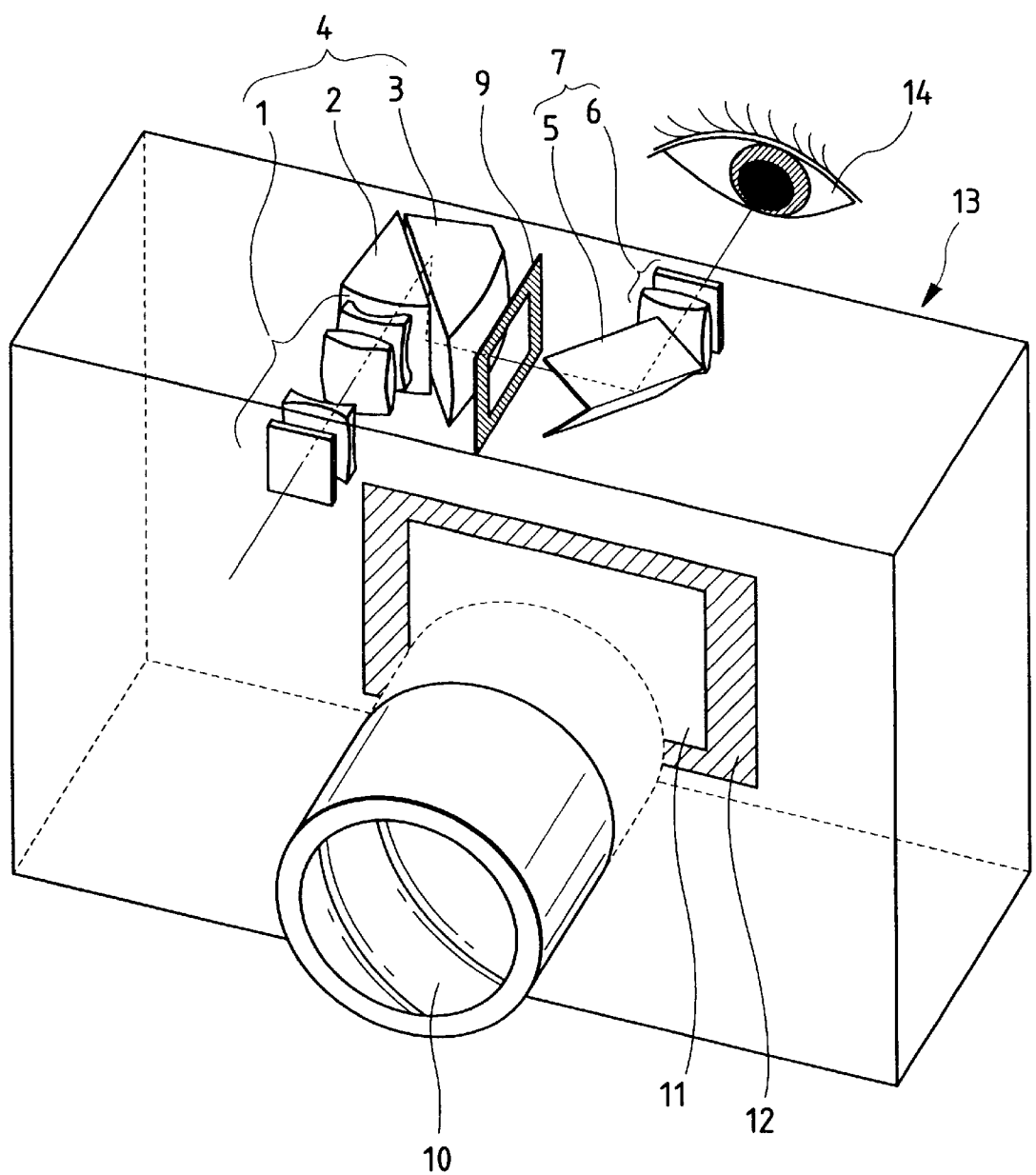
FIG. 12 schematically shows a configuration of a camera with a real image mode finder according to a ninth embodiment of the present invention.

As shown in FIG. 12, a camera 13 according to a ninth embodiment is a so-called "lens shutter camera", which is provided with a real image mode finder that is separate from a photographic lens 10 and that introduces an image of an outside object into an eye 14 of an observer. The basic configuration of the real image mode finder incorporated in the camera 13 of the ninth embodiment is similar to that in the foregoing embodiments and thus like components are represented by like reference numerals. The real image mode finder is provided with a field frame 9 adjacent to an intermediate image plane formed by the objective optical system 4 so that the image should be observed in good visibility. It is preferred that the field frame 9 is disposed between the exit surface of the second prism 3 and the most second-prism-side one of the reflecting surfaces 5 included in the eyepiece optical system 7. When a photographic film is set in place, a film surface 11 is disposed substantially on an image plane of the photographic lens 10. As shown in FIG. 12, a field stop 12 with a rectangular shape is disposed immediately before the film surface 11, to determine a photograph area. The shorter side of the rectangle extends in a direction substantially perpendicular to a plane in which the axis equivalent to the optical axis of the real image mode finder (i.e. a path of ray travelling along the optical axis of the objective unit 1 through along the optical axis of the eyepiece unit 6) lies. The longer side of the rectangle extends in a direction substantially parallel to the plane in which the axis equivalent to the optical axis of the real image mode finder lies.

The objective unit 1 and the eyepiece unit 6 of the real image mode finder are machined into a shape with ineffective portions being cut off, to achieve small size and light weight of the finder. Consequently, the entire camera 13 also achieves compactness. The above-mentioned features of the ninth embodiment are not limited to the particular real image mode finder shown in FIG. 12, but may be applied to any of the real image mode finders described in the foregoing embodiments.

What is claimed is:

1. A real image mode finder comprising, in order from an object side:
   an objective optical system comprising, in order from an object side, an objective unit, a first prism, and a second prism; and
   an eyepiece optical system having at least one reflecting surface,
   wherein said first prism has an entrance surface which transmits a light beam emerging from said objective unit and a transmission surface which is optically inclined with respect to the entrance surface so that a ray travelling along an optical axis of said objective unit is obliquely incident on the transmission surface,
   wherein said second prism has a reflecting surface which is situated nearly opposite to the entrance surface of said first prism and which obliquely reflects the light beam transmitted through said first prism toward the object side, a transmitting-reflecting surface which is located substantially parallel with the transmission surface of said first prism, at a minute distance away therefrom, to transmit the light beam transmitted through said first prism and to totally reflect the light beam from the reflecting surface, and an exit surface; and
   wherein said objective unit, said first prism and said second prism form an immediate image plane adjacent to the exit surface of said second prism.

2. A real image mode finder according to claim 1, wherein the reflecting surface of said second prism is constructed with a planar surface and said at least one reflecting surface of said eyepiece optical system is configured as a roof surface.

3. A real image mode finder according to claim 1, wherein the reflecting surface of said second prism is constructed with a roof surface and said at least one reflecting surface of said eyepiece optical system is configured as a planar surface.

4. A real image mode finder according to claim 1, satisfying the following conditions in a plane in which the optical axis of said objective unit and an axis equivalent to the optical axis of said objective unit, which is bent through said first prism and said second prism as a path of the ray travelling along the optical axis of said objective unit, lie:

$$80° \leq \gamma \leq 100°$$
$$0 \leq n_2 - n_1 < 0.1$$

where $\gamma$ is an angle made by the optical axis of said objective unit with the axis equivalent to the optical axis of said objective unit as emerging from the exit surface of said second prism after passing through said first prism and being bent by said second prism, $n_1$ is a refractive index of a material of said first prism, and $n_2$ is a refractive index of a material of said second prism.

5. A real image mode finder according to claim 1, wherein at least one of the entrance surface of said first prism and the exit surface of said second prism has a curvature.

6. A real image mode finder according to claim 1, wherein the transmission surface of said first prism is provided with an anti-reflection coating.

7. A real image mode finder according to claim 1, wherein, of non-effective portions on the surfaces used for transmission or reflection and of surfaces unrelated to transmission or reflection in said first prism and said second prism, at least one part receives surface treatment for preventing detrimental light.

8. A real image mode finder according to claim 1, wherein at least one of said first prism and said second prism is made of plastic.

9. A real image mode finder according to claim 1, wherein an air space d between the transmission surface of said first prism and the transmitting-reflecting surface of said second prism satisfies the following condition:

$$0 < d \leq 0.2 \text{ mm}.$$

10. A real image mode finder according to claim 1, wherein an axis equivalent to the optical axis of said objective unit, which is defined as a path of the ray travelling along the optical axis of said objective unit, is free from intersection with itself inside said second prism.

11. A real image mode finder according to claim 1, wherein said at least one reflecting surface of said eyepiece optical system consists of a single surface, and surfaces that are used for reflection in the real image mode finder consist of the reflecting surface of said second prism, the transmitting-reflecting surface of said second prism, and the reflecting surface of said eyepiece optical system.

12. A camera comprising:
    the real image mode finder according to claim 1.

13. A real image mode finder comprising, in order from an object side:
    an objective optical system comprising, in order from an object side, an objective unit, a first prism, and a second prism; and
    an eyepiece optical system having at least one reflecting surface,
    wherein said first prism has an entrance surface which transmits a light beam emerging from said objective unit and a transmission surface which is inclined with respect to the entrance surface so that a normal thereto is oblique with respect to an optical axis of said objective unit;
    wherein said first prism is constructed and arranged so that, of the light beam emerging from said objective unit and transmitted through the entrance surface of said first prism, a ray travelling along the optical axis of said objective unit is directly introduced to said transmission surface, is obliquely incident thereon, and is transmitted therethrough free from reflection inside said first prism; and
    wherein said second prism has a reflecting surface which is situated nearly opposite to the entrance surface of said first prism and which obliquely reflects the light beam transmitted through said first prism toward the object side, a transmitting-reflecting surface which is located substantially parallel with the transmission surface of said first prism, at a minute distance away therefrom, to transmit the light beam transmitted through said first prism with the ray travelling along the optical axis of said objective lens being obliquely incident thereon and to totally reflect the light beam from the reflecting surface, and an exit surface.

14. A real image mode finder according to claim 13, wherein the reflecting surface of said second prism is constructed with a planar surface and said at least one reflecting surface of said eyepiece optical system is configured as a roof surface.

15. A real image mode finder according to claim 13, wherein the reflecting surface of said second prism is constructed with a roof surface and said at least one reflecting surface of said eyepiece optical system as a planer surface.

16. A real image mode finder according to claim 13, satisfying the following conditions in a plane in which the optical axis of said objective unit and an axis equivalent to the optical axis of said objective unit, which is bent through said first prism and said second prism as a path of the ray travelling along the optical axis of said objective unit, lie:

$$80° \leq \gamma \leq 100°$$

$$0 \leq n_2 - n_1 < 0.1$$

where $\gamma$ is an angle made by the optical axis of said objective unit with the axis equivalent to the optical axis of said objective unit as emerging from the exit surface of said second prism after passing through said first prism and being bent by said second prism, $n_1$ is a refractive index of a material of said first prism, and $n_2$ is a refractive index of a material of said second prism.

17. A real image mode finder according to claim 13, wherein at least one of the entrance surface of said first prism and the exit surface of said second prism has a curvature.

18. A real image mode finder according to claim 13, wherein the transmission surface of said first prism is provided with an anti-reflection coating.

19. A real image mode finder according to claim 13, wherein, of non-effective portions on the surfaces used for transmission or reflection and of surfaces unrelated to transmission or reflection in said first prism and said second prism, at least one part receives surface treatment for preventing detrimental light.

20. A real image mode finder according to claim 13, wherein at least one of said first prism and said second prism is made of plastic.

21. A real image mode finder according to claim 13, wherein an air space d between the transmission surface of said first prism and the transmitting-reflecting surface of said second prism satisfies the following condition:

$$0 < d \leq 0.2 \text{ mm.}$$

22. A real image mode finder according to claim 13, wherein said at least one reflecting surface of said eyepiece optical system consists of a single surface, and surfaces that are used for reflection in the real image mode finder consist of the reflecting surface of said second prism, the transmitting-reflecting surface of said second prism, and the reflecting surface of said eyepiece optical system.

23. A real image mode finder according to claim 13, wherein a field frame is disposed between the exit surface of said second prism and a most second-prism side of said at least one reflecting surface of said eyepiece optical system.

24. A camera comprising:
the real image mode finder according to claim 13.

25. A real image mode finder comprising, in order form an object side:
an objective optical system comprising, in order form an object side, an objective unit, a first prism, and a second prism; and
an eyepiece optical system having at least one reflecting surface,
wherein said first prism has an entrance surface which transmits a light beam emerging from said objective unit and a transmission surface which is inclined with respect to the entrance surface so that a normal thereto is oblique with respect to an optical axis of said objective unit, the light beam emerging from said objective unit and transmitted through the entrance surface of said first prism being directly introduced to said transmission surface,
wherein said second prism has a reflecting surface which is situated nearly opposite to the entrance surface of said first prism and which obliquely reflects the light beam transmitted through said first prism toward the object side, a transmitting-reflecting surface which is located substantially parallel with the transmission surface of said first prism, at a minute distance away therefrom, to transmit the light beam transmitted through said first prism and to totally reflect the light beam from the reflecting surface, and an exit surface, and
wherein said objective unit, said first prism and said second prism form an intermediate image plane adjacent to the exit surface of said second prism.

26. A real image mode finder, comprising, in order from an object side:
an objective optical system comprising, in order from an object side, an objective unit, a first prism, and a second prism; and
an eyepiece optical system having at least one reflecting surface,
wherein said first prism has an entrance surface which transmits a light beam emerging from said objective unit and a transmission surface which is inclined with respect to the entrance surface so that a normal thereto is oblique with respect to an optical axis of said objective unit, the light beam emerging from said objective unit and transmitted through the entrance surface of said first prism being directly introduced to said transmission surface,
wherein said second prism has a reflecting surface which is situated nearly opposite to the entrance surface of said first prism and which obliquely reflects the light beam transmitted through said first prism toward the object side, a transmitting-reflecting surface which is located substantially parallel with the transmission surface of said first prism, at a minute distance away therefrom, to transmit the light beam transmitted through said first prism and to totally reflect the light beam from the reflecting surface, and an exit surface, and
wherein an axis equivalent to the optical axis of said objective unit, which is defined as a path of the ray travelling along the optical axis of said objective unit, is free from intersection with itself inside said second prism.

27. A real image mode finder comprising, in order from an object side:
an objective optical system comprising, in order from an object side, an objective unit, a first prism, and a second prism; and
an eyepiece optical system having at least one reflecting surface,
wherein said first prism has an entrance surface which transmits a light beam emerging from said objective unit and a transmission surface which is inclined with respect to the entrance surface so that a normal thereto is oblique with respect to an optical axis of said objective unit, the light beam emerging from said objective unit and transmitted through the entrance surface of said first prism being directly introduced to said transmission surface, wherein said second prism has a reflecting surface which is situated nearly opposite to the entrance surface of said first prism and which obliquely reflects the light beam transmitted through said first prism toward the object side, a transmitting-reflecting surface which is located substantially parallel with the transmission surface of said first prism, at a minute distance away therefrom, to transmit the light beam transmitted through said first prism and to totally reflect the light beam from the reflecting surface, and an exit surface, and wherein a field frame is disposed between the exit surface of said second prism and a most second-prism-side of said at least one reflecting surface of said eyepiece optical system.

* * * * *